US012198507B2

(12) United States Patent
Berman

(10) Patent No.: US 12,198,507 B2
(45) **Date of Patent: *Jan. 14, 2025**

(54) GAMING DEVICES AND METHODS FOR ENRICHING GAME PLAY WITH MIGRATING AWARD ENHANCEMENTS

(71) Applicant: KING SHOW GAMES, INC., Minnetonka, MN (US)

(72) Inventor: Bradley Berman, Minnetonka, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/375,778

(22) Filed: Oct. 2, 2023

(65) Prior Publication Data

US 2024/0029522 A1 Jan. 25, 2024

Related U.S. Application Data

(63) Continuation of application No. 17/322,259, filed on May 17, 2021, now Pat. No. 11,776,363, which is a continuation of application No. 16/687,111, filed on Nov. 18, 2019, now Pat. No. 11,011,028.

(60) Provisional application No. 62/769,315, filed on Nov. 19, 2018.

(51) Int. Cl.
*G07F 17/32* (2006.01)

(52) U.S. Cl.
CPC ...... *G07F 17/3293* (2013.01); *G07F 17/3267* (2013.01)

(58) Field of Classification Search
CPC .. G07F 17/32; G07F 17/3267; G07F 17/3293; G07F 17/34
USPC .................................................. 463/11, 12, 13
See application file for complete search history.

(56) References Cited

U.S. PATENT DOCUMENTS

| | | | | |
|---|---|---|---|---|
| 9,953,490 | B2 * | 4/2018 | Acres | G07F 17/3293 |
| 10,453,304 | B2 | 10/2019 | Lamb | |
| 2011/0136566 | A1 * | 6/2011 | Acres | G07F 17/3293 463/22 |
| 2013/0252707 | A1 * | 9/2013 | Thomas | G07F 17/3267 463/16 |
| 2013/0267288 | A1 * | 10/2013 | Di Bella | G07F 17/32 463/11 |
| 2016/0098902 | A1 * | 4/2016 | Acres | G07F 17/32 463/13 |
| 2018/0211492 | A1 * | 7/2018 | Acres | G07F 17/32 |
| 2020/0051400 | A1 * | 2/2020 | Acres | G07F 17/32 |

OTHER PUBLICATIONS

Casino Journal, "Ocean Magic Class III video slot machine-IGT", dated Nov. 2, 2016, 5 pages.
Strictly Slots Game Review, "Slot Spotlight", Aug. 2017, 5 pages.

* cited by examiner

*Primary Examiner* — Pierre E Elisca

(57) ABSTRACT

Systems, apparatuses and methods for providing opportunities to enhance gaming results over a plurality of gaming events. In one embodiment, award enhancements such as wild cards and/or payout modifiers migrate through a multi-hand poker array over multiple poker games, thereby changing the award enhancement opportunities as the award enhancements migrate.

20 Claims, 9 Drawing Sheets

GAMING DEVICES AND METHODS FOR ENRICHING GAME PLAY WITH MIGRATING AWARD ENHANCEMENTS

RELATED APPLICATIONS

This application is a continuation of U.S. application Ser. No. 17/322,259, filed May 17, 2021, now U.S. Pat. No. 11,776,363, which is a continuation of U.S. application Ser. No. 16/687,111, filed Nov. 18, 2019, now U.S. Pat. No. 11,011,028, which claims the benefit of Provisional Patent Application No. 62/769,315 filed on Nov. 19, 2018, to which priority is claimed pursuant to 35 U.S.C. § 119(e), each of which is incorporated herein by reference in their entirety.

FIELD

This disclosure relates generally to games, and more particularly to systems, apparatuses and methods for providing opportunities to enhance gaming results in gaming devices.

BACKGROUND

Casino games such as poker, slots, and craps have long been enjoyed as a means of entertainment. Some of these games originated using traditional elements such as playing cards or dice. More recently, gaming devices have been developed to simulate and/or further enhance these games while remaining entertaining. The popularity of casino gambling with wagering continues to increase, as does recreational gambling such as non-wagering computer game gambling. Part of this popularity is due to the increased development of new types of games that are implemented, at least in part, on gaming devices.

One reason that casino games are widely developed for gaming devices is that a wide variety of games can be implemented on gaming devices, thereby providing an array of choices for players looking to gamble. For example, the graphics and sounds included in such games can be modified to reflect popular subjects, such as movies and television shows. Game play rules and types of games can also vary greatly providing many different styles of gambling. Additionally, gaming devices require minimal supervision to operate on a casino floor, or in other gambling environments. That is, as compared to traditional casino games that require a dealer, banker, stickman, pit managers, etc., gaming devices need much less employee attention to operate.

With the ability to provide new content, players have come to expect the availability of an ever wider selection of new games when visiting casinos and other gaming venues. Playing new games adds to the excitement of "gaming." As is well known in the art and as used herein, the term "gaming" and "gaming devices" generally involves some form of wagering, and that players make wagers of value, whether actual currency or something else of value, e.g., token or credit. Wagering-type games usually provide rewards based on random chance as opposed to skill, although some skill may be an element in some types of games. Since random chance is a significant component of these games, they are sometimes referred to as "games of chance."

The present disclosure describes systems, apparatuses and methods that facilitate new and interesting gaming experiences, and provide advantages over the prior art.

SUMMARY

The present disclosure is directed to systems, apparatuses, computer-readable media, and/or methods that are configured to provide opportunities to enhance gaming results over a plurality of gaming events. In one embodiment, award enhancement (including award enhancement identifiers that correspond to award enhancements) migrate through the game play area over multiple gaming events, thereby changing the award enhancement opportunities as the award enhancements migrate.

In one poker-related embodiment, enhancement identifiers are randomly provided, and are associated with at least one card of a poker hand. The enhancement identifiers may be any one or more of, for example, a multiplier or other payout modifier, card upgrades (e.g., change from one card to another card having a higher probability of obtaining a winning outcome and/or an outcome with a higher payout), Wild cards (e.g., a card able to serve as any other card in the deck, or some subset of the cards of the deck), etc. After the enhancement identifier provides the enhanced feature for a poker deal event (whether playing a single-hand or multiple-hand game), the enhancement identifier migrates to enable another hand in a subsequent poker deal event to potentially benefit from the enhancement. For example, a bubble(s) could randomly rise into the play area in a multi-play poker hand, and float up to a card and become an enhancement (e.g., Wild card, multiplier, Wild card plus multiplier, split card, etc.), the hand is played with the enhancement, and on the next hand the bubble(s) could migrate to the next hand and/or other location in the game play area. Thus, on successive (with or without gaps) poker deals, the bubble(s) and/or other enhancement becomes available with other hands or at least in different locations.

In accordance with one embodiment, an electronic poker device for playing poker games is provided. The device includes a display configured to present poker hands each having a plurality of cards presented at respective card positions for each of the poker games. The device further includes a user interface configured to at least enable player interaction with each of the poker games, and a processor. In one embodiment, the processor is configured to randomly select cards to present for each of the poker hands at their respective card positions for each of the poker games. On any randomly selected one of the poker games, the processor may be configured to position a poker hand enhancement at a randomly designated card position of a respective one of the poker hands. The processor is configured to facilitate completion of each of the poker hands of the randomly selected poker game, using the poker hand enhancement at the respective one of the poker hands. The processor is further configured to facilitate participation additional poker games, and move the poker hand enhancement to a corresponding card position of adjacent poker hands on each of the additional poker games.

In a particular embodiment of such an electronic poker device, the poker hand enhancement comprises a multiplier to increase a payout on the poker hand in which the poker hand enhancement is used. In another embodiment, the poker hand enhancement comprises a wild card, where in a more particular embodiment, the poker hand enhancement further comprises a multiplier in addition to the wild card function, to increase a payout on the poker hand in which the poker hand enhancement is used.

In another embodiment of such an electronic poker device, the processor is configured to position one or more additional poker hand enhancements at respectively randomly designated card positions of the plurality of poker hands.

In still another embodiment of such an electronic poker device, the processor is configured to move the poker hand enrichment to the corresponding card position of adjacent poker hands on each successive poker game until each of the poker hands has used the poker hand enrichment.

In yet another embodiment of such an electronic poker device, the processor is configured to, on the randomly selected poker game, position the poker hand enhancement at the randomly designated card position of the poker hand that is positioned at the bottom of a play area array of the poker hands. In a more particular embodiment, the processor is configured to, on the next poker game, move the poker hand enhancement to the corresponding card position on the poker hand adjacent to and above the poker hand that is positioned at the bottom of the array. In a still more particular embodiment, the processor is configured to, on each additional poker game, move the poker hand enhancement to the corresponding card position on the poker hand adjacently above the poker hand where the poker hand enhancement was previously used, and to do so until the poker hand enhancement has been used by the highest poker hand in the array.

In another embodiment of such a poker device, the processor is configured to cause the display to move the poker hand enhancement from a position outside of the array of poker hands to the randomly designated card position of the poker hand that is positioned at the bottom of the array of poker hands.

In another embodiment of such a poker device, the processor is configured to cause the display to move a visible item from a position outside of the array of poker hands to designate the randomly designated card position of the poker hand that is positioned at the bottom of the array of poker hands, and to place a wild card as the poker hand enhancement at the randomly designated card position designated by the visible item.

In another embodiment, a gaming apparatus is for playing poker games, which includes a display configured to present poker hands each having a cards presented at respective card positions for each of the poker games. The gaming apparatus includes a user interface configured to at least enable a player to interact with each of the poker games, and a processor. The processor is configured to randomly select cards to present at respective card positions for each of poker hand-1 through poker hand-N in a first poker game, and to position a wild card at a randomly designated card positions of the poker hand-1 of the first poker game. The processor facilitates completion of each of poker hand-1 through poker hand-N of the first poker game, using the wild card for the poker hand-1 of the first poker game. After completion of the first poker game, the processor initiates a second poker game having corresponding card positions in a corresponding poker hand-1 through poker hand-N, and moves the wild card from its randomly designated card position of poker hand-1 of the first poker game to a corresponding card position in poker hand-2 of the second poker game. The processor is configured to randomly select cards to present at respective card positions for the remaining card positions for the poker hand-1 through poker hand-N of the second poker game. The processor further facilitates completion of each of poker hand-1 through poker hand-N of the second poker game, using the wild card for the poker hand-2 of the second poker game.

In a more particular embodiment of such a gaming apparatus, the processor is configured to include a payout multiplier with the wild card at the randomly designated card position of the poker hand-1 of the first poker game, and to increase any payout occurring on poker hand-1 of the first poker game by an amount corresponding to the payout multiplier. In a more particular embodiment, the processor is configured to move the wild card and its included payout multiplier to the corresponding card position in poker hand-2 of the second poker game, and to increase any payout occurring on poker hand-2 of the second poker game by an amount corresponding to the payout multiplier.

According to another embodiment of such a gaming apparatus, the processor is further configured to, after completion of the second poker game, initiate a third poker game having corresponding card positions in a corresponding poker hand-1 through poker hand-N. The processor is configured to move the wild card from its randomly designated card position of poker hand-2 of the second poker game to a corresponding card position in poker hand-3 of the third poker game. Such a processor may be further configured to randomly select cards to present at respective card positions for the remaining card positions for the poker hand-1 through poker hand-N of the third poker game, and to facilitate completion of each of poker hand-1 through poker hand-N of the third poker game, using the wild card for the poker hand-3 of the third poker game. In a more particular embodiment, the processor is configured to position a payout multiplier in addition to the wild card at the corresponding card position in poker hand-3 of the third poker game, and to increase any payout occurring on poker hand-3 of the first poker game by an amount corresponding to the payout multiplier.

In accordance with another embodiment of such a gaming apparatus, the processor is further configured to continue to move the wild card from its card position in a current poker game to a corresponding card position in a subsequent poker game, presenting cards and facilitating completion of each of the poker hand-1 through poker hand-N of each subsequent poker game and using the wild card in the poker hand to which it has been moved, until the wild card has been used in each of the poker hand-1 through poker hand-N of a corresponding number of the poker games.

According to another embodiment, a gaming device is provided for playing poker games. The gaming device includes a display configured to present poker hands having a respective plurality of cards presented at respective card positions. The gaming device includes a user interface configured to at least enable player interaction with each of the poker hands. The gaming device includes a processor configured to randomly select cards to present at the respective card positions for a first poker hand, position an enhanced card at a randomly designated card position of the first poker hand, and facilitate completion of the first poker hand using the enhanced card. The processor is further configured to move the enhanced card from its randomly designated card position of the first poker hand to a corresponding card position of a second poker hand that is played immediately following the first poker hand. The processor is configured to randomly select cards to present at remaining card positions of the second poker hand, and to facilitate completion of the second poker hand using the enhanced card.

In a more particular embodiment of such a gaming device, the processor is configured to cause the display to move the enhanced card from the randomly designated card position of the first poker hand such that it perceivably wraps around to the corresponding card position of the second poker hand.

In various embodiments, the enhanced card includes a wild card and/or a wild card with multiplier or other payout modifier.

This summary serves as an abbreviated, selective introduction of a representative subset of various concepts and embodiments that are further described or taught to those skilled in the art in the Specification herein. This summary is not intended to refer to all embodiments, scopes, or breadths of claims otherwise supported by the Specification, nor to identify essential features of the claimed subject matter, nor to limit the scope of the claimed subject matter.

DETAILED DESCRIPTION

Figure 1:
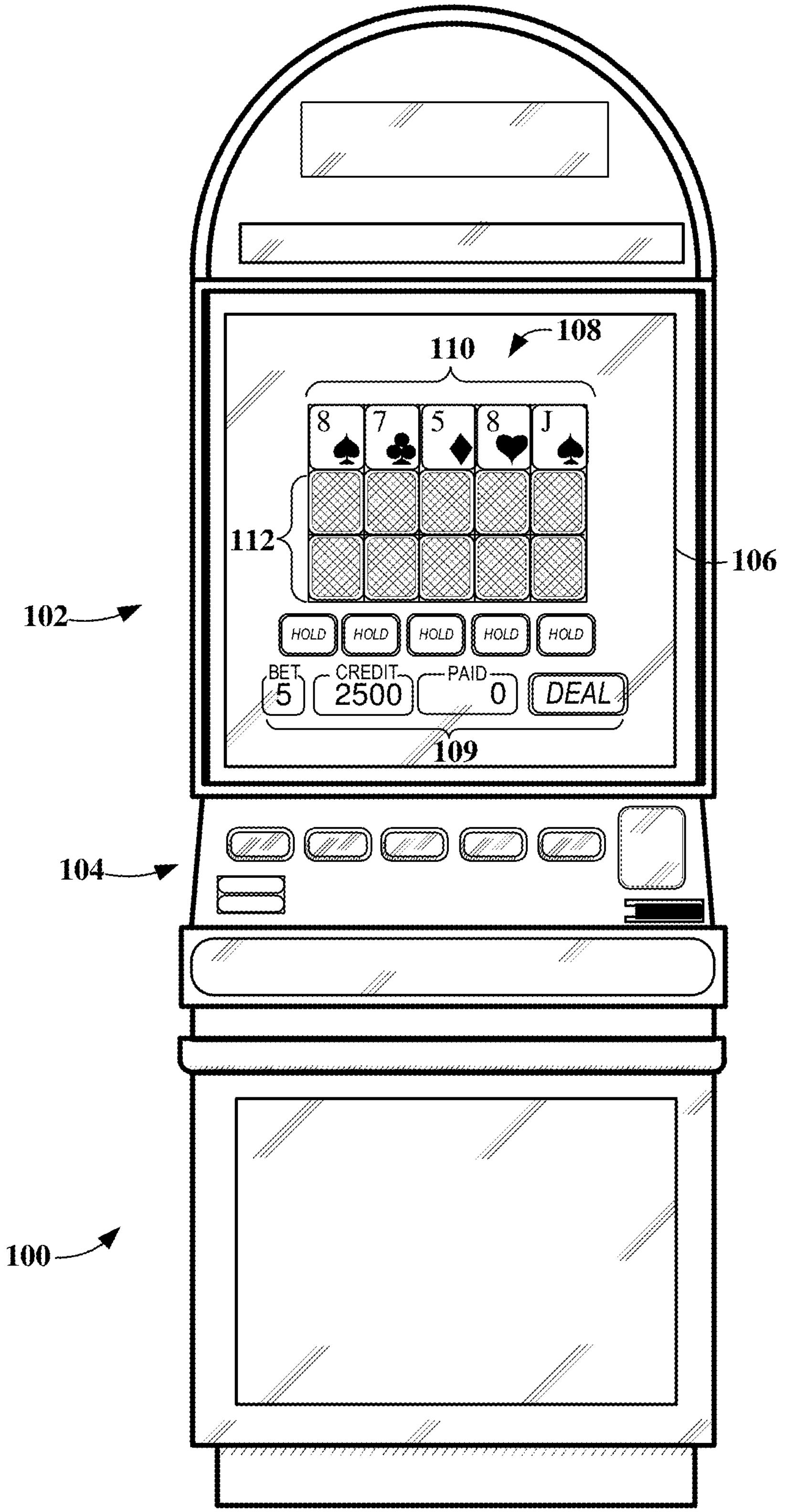
FIG. 1 is a diagram of a representative gaming machine capable of facilitating player use and interaction with games and features in accordance with the invention and representative embodiments described herein.

In the following description of various exemplary embodiments, reference is made to the accompanying drawings which form a part hereof, and in which is shown by way of illustration representative embodiments in which the features described herein may be practiced. It is to be understood that other embodiments may be utilized, as structural and operational changes may be made without departing from the scope of the disclosure.

In the description that follows, the terms "reels," "cards," "decks," and similar mechanically descriptive language may be used to describe various apparatus presentation features, as well as various actions occurring to those objects (e.g., "spin," "draw," "hold," "bet"). Although the present disclosure may be applicable to manual, mechanical, and/or computerized embodiments, as well as any combination therebetween, the use of mechanically descriptive terms is not meant to be only applicable to mechanical embodiments. Those skilled in the art will understand that, for purposes of providing gaming experiences to players, mechanical elements such as cards, reels, and the like may be simulated on a display in order to provide a familiar and satisfying experience that emulates the behavior of mechanical objects, as well as emulating actions that occur in the non-computerized games (e.g., spinning, holding, drawing, betting). Further, the computerized version may provide the look of mechanical equivalents but may be generally randomized in a different way. Thus, the terms "cards," "decks," "reels," "hands," etc., are intended to describe both physical objects and emulation or simulations of those objects and their behaviors using electronic apparatuses.

In various embodiments, the gaming displays are described in conjunction with the use of data in the form of "symbols." In the context of this disclosure, a "symbol" may generally refer at least to a collection of one or more arbitrary indicia or signs that have some conventional or defined significance. In particular, the symbol may represent values that can at least be used to determine whether to award a payout. A symbol may include numbers, letters, shapes, pictures, textures, colors, sounds, etc., and any combination therebetween. A play state, such as a win, can be determined by comparing the symbol with one or more other symbols. Such comparisons can be performed, for example, via software by mapping numbers (or other data structures such as character strings) to the symbols and performing the comparisons on the numbers/data structures. Other conventions associated with known games (e.g., the numerical value/ordering of face cards and aces in card games) may also be programmatically analyzed to determine winning combinations.

Generally, gaming systems, gaming apparatuses and gaming methods are disclosed for enhancing payouts and/or game elements to increase the likelihood of winning outcomes and/or increase payouts associated with winning outcomes. The systems, apparatuses and methods described herein may be implemented as a single game, or part of a multi-part game. For example, the game features described herein may be implemented in primary gaming activities, bonus games, side bet games or other secondary games associated with a primary gaming activity. The game features may be implemented in stand-alone games, multi-player games, etc. Further, the disclosure may be applied to games of chance, and descriptions provided in the context of any representative game (e.g. poker, such as video poker) is provided for purposes of facilitating an understanding of the features described herein. However, the principles described herein are equally applicable to any game of chance where an outcome(s) is determined for use in the player's gaming activity.

Embodiments of the present concept include providing gaming devices (also referred to as gaming apparatuses or gaming machines), gaming systems, and methods of operating these devices or systems to provide game play that involves migrating indicia beneficial to the game play outcomes and/or payouts over a plurality of gaming events. For example, in the context of video poker, a multiplier, Wild card, and/or other beneficial game element may be randomly associated with one or more cards in a poker game involving any number of poker hands. Upon using those beneficial game elements in a current poker game/hand, the beneficial game element moves to a new location for a subsequent poker game/hand, such as the next poker game/hand, where the beneficial game element may again be used in that poker game/hand. This migration may continue until the beneficial game element moves out of the play area, or experiences a termination symbol, or otherwise meets some criteria defined to end the player's ability to use that particular beneficial game element. In some embodiments, the beneficial game element may transform as the migration spanning multiple poker games/hands occurs, such as increasing a multiplier on each movement, and/or other transformation.

Thus, in one embodiment, the gaming activity is a card game, which may involve a single hand of cards or multiple hands of cards. The cards serve as the indicia that enables games to be conducted, through interaction of the card indicia. In one embodiment, the card game is a poker game, and the principles herein may be applied in any poker context, regardless of the type of poker game, including but not limited to stud poker variations, draw poker variations, community card poker variations, any combination thereof, or any other wagering game utilizing cards.

Numerous variations are possible in view of these and other embodiments of the disclosure. Representative embodiments and variations are described herein, with some embodiments described with reference to the drawings. However, many other embodiments and variations exist that are covered by the principles and scope of this concept. For example, although some of the embodiments discussed below involve video poker examples, other embodiments include application of these inventive techniques in other types of keno, bingo, slot games, roulette, or other games of chance. Some of these other types of embodiments will be discussed below as variations to the examples illustrated. However, many other types of games can implement similar techniques and fall within the scope of this disclosed concept.

Referring to the example gaming apparatus 100 shown in FIG. 1, the representative gaming apparatus includes at least a display area(s) 102 (also referred to as a gaming display), and a player interface area(s) 104, although some or all of the interactive mechanisms included in the user interface area 104 may be provided via other or additional means, such as graphical icons used with a touch screen in the display area 102 in some embodiments. The display area 102 may include one or more game displays 106 (also referred to as "displays" or "gaming displays") that may be included in physically separate displays or as portions of a common large display. Here, the representative game display 106 includes at least a primary game play portion 108 that displays game elements and symbols 110, and an operations portion 109 that can include meters, various game buttons and other input mechanisms, and/or other game information for a player of the gaming device 100.

The user interface 104 allows the user to control, engage in play of, and otherwise interact with the gaming machine 100. The particular user interface mechanisms included with user interface 104 may be dependent on the type of gaming device. For example, the user interface 104 may include one or more buttons, switches, joysticks, levers, pull-down handles, trackballs, voice-activated input, touchscreen input, tactile input, and/or any other user input system or mechanism that allows the user to play and interact with the particular gaming activity.

The user interface 104 may allow the user or player to enter coins, bills, or otherwise obtain credits through vouchers, tokens, credit cards, tickets, electronic money, etc. Various mechanisms for entering such vouchers, tokens, credit cards, coins, tickets, etc. are described below with reference to FIG. 2. For example, currency input mechanisms, card readers, credit card readers, smart card readers, punch card readers, radio frequency identifier (RFID) readers, and other mechanisms may be used to enter wagers. The user interface 104 may also include a mechanism to read and/or validate player information, such as player loyalty information to identify a user or player of the gaming device. This mechanism may be, for example, a card reader, biometric scanner, keypad, or other input device. It is through a user interface such as the user interface 104 that the player can initiate and engage in gaming activities. While the illustrated embodiment depicts various buttons for the user interface 104, it should be recognized that a wide variety of user interface options are available for use in connection with the present invention, including pressing buttons, touching a segment of a touch-screen, entering text, entering voice commands, or other known data entry methodology.

The game display 106 in the display area 102 may include one or more of an electronic display, a video display, a mechanical display, and fixed display information, such as pay table information associated with a glass/plastic panel(s) on the gaming machine 100 and/or graphical images. The symbols or other indicia associated with the play of the game may be presented on an electronic display device or on mechanical devices associated with a mechanical display. Generally, in some embodiments, the display 106 devotes the largest portion of viewable area to the primary gaming portion 108. The primary gaming portion 108 may provide visual feedback to the user for any selected game. The primary gaming portion 108 may render graphical objects such as cards, slot reels, dice, animated characters, and any other gaming visual known in the art. The primary gaming portion 108 may also inform players of the outcome of any particular event, including whether the event resulted in a win or loss.

In some embodiments described herein, the primary gaming portion 108 may display a grid(s) or equivalent arrangement(s) of playing cards 110 forming one or more hands or other sets of cards in a card game, such as a poker game. In the illustrated example, a set of five playing cards 110 forms a video poker hand, which represents a portion of a game play event. For example, if the game play event is a video draw poker game, the gaming device 100 may deal five cards, allow the user to select cards to hold, deal replacements for the cards not held, and determine a payout based on the final cards in the hand. The illustration and description of five-card draw poker is for purposes of example and not of limitation, as the disclosure is applicable to numerous other card games, such as stud poker or hold 'em poker, as well as other types of gaming activities and apparatuses, such as slot machines, dice, coins, etc. For example, some embodiments may relate to slot games, where the primary gaming portion 108 presents a grid (or equivalent arrangement) of symbols or other game elements in respective symbol locations (not shown), where the symbols or combinations of symbols determine gaming outcomes.

In some embodiments, the primary gaming portion 108 may also display one or more additional hands 112 of playing cards, such as in a multi-play poker embodiment. For example, one multi-play poker embodiment involves draw poker, where at least one hand 110 is dealt, and cards held by the player in hand 110 are replicated into one or more other hands 112, whereby all hands 110, 112 may then be completed with replacement cards while having one or more commonly held cards. Multi-play embodiments may also be played without holding any cards, and/or without replication of held cards into other hands. In some embodiments, other hands 112 may represent discrete, individually-played additional hands of cards that are unrelated to the play of other hands 110.

The primary gaming portion 108 may include other features known in the art that facilitate gaming, such as status and control portion 109. As is generally known in the art, this portion 109 provides information about current bets, current wins, remaining credits, etc. associated with gaming activities of the grid of game elements 110. The control portion 109 may also provide touchscreen controls for facilitating game play. The grid of game elements 110 may also include touchscreen features, such as facilitating selection of individual cards to hold and/or selection of individual cards to discard and replace (e.g., in a draw poker embodiment), which subset of cards of a larger set of cards to hold/use for a final hand(s)(e.g., in some stud poker embodiments), wagering inputs, etc. The game display 106 of the display area 102 may include other features that are not shown, such as pay tables, navigation controls, etc.

Figure 2:
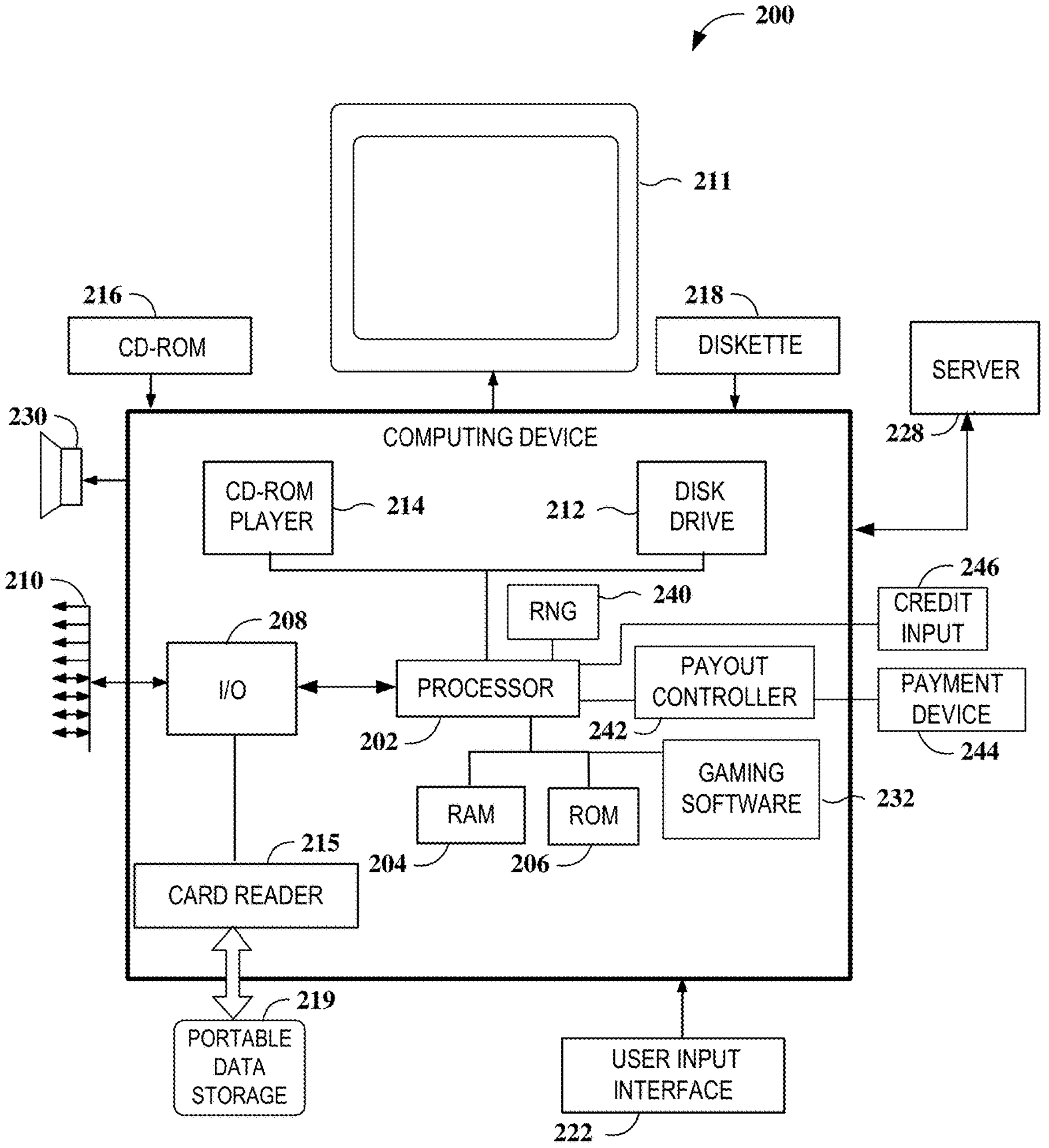
FIG. 2 is a block diagram illustrating a representative computing arrangement capable of implementing games and features in accordance with the invention and representative embodiments described herein.

Although FIG. 1 illustrates a particular implementation of some of the embodiments in a casino or electronic gaming machine ("EGM"), one or more devices may be programmed to play various embodiments of the disclosure. The concepts and embodiments described herein may be implemented, as shown in FIG. 1, as an electronic/video gaming machine or other special purpose gaming kiosk, or may be implemented via computing systems operating under the direction of local gaming software, and/or remotely-provided software such as provided by an application service provider (ASP). Such gaming machines may also utilize computing systems to control and manage the gaming activity, although these computing systems typically include specialized components and/or functionality to operate the particular elements of electronic gaming machines. Additionally, computing systems operating over networks, such as the Internet, may also include specialized components and/or functionality to operate elements particular to these systems, such as random number generators. An example of a representative computing system capable of carrying out operations in accordance with the principles described herein is illustrated in FIG. 2.

Hardware, firmware, software or any combination thereof may be used to perform the various gaming functions, display presentations and operations described herein. The functional modules used in connection with the disclosure may reside in a gaming machine as described, or may alternatively reside on a stand-alone or networked computer. The representative computing structure 200 of FIG. 2 is an example of a computing structure that can be used in connection with such electronic gaming machines, computers, or other computer-implemented devices to carry out operations of the present invention. Although numerous components or elements are shown as part of this computing structure 200 in FIG. 2, additional or fewer components may be utilized in particular implementations of embodiments of the invention.

The example computing arrangement 200 suitable for performing the gaming functions described herein includes a processor(s), such as depicted by the representative central processing unit (CPU) 202, coupled to memory, such as random access memory (RAM) 204, and some variation of read-only memory (ROM) 206 or other persistent storage. The ROM 206 may also represent other types of storage media to store programs, such as programmable ROM (PROM), erasable PROM (EPROM or any technology capable of storing data). The processor 202 may communicate with other internal and external components through input/output (I/O) circuitry 208 and bussing 210, to communicate control signals, communication signals, and the like.

The computing arrangement 200 may also include one or more data storage devices, including hard and floppy disk drives 212, CD-ROM drives 214, card reader 215, and other hardware capable of reading and/or storing information such as DVD, etc. In one embodiment, software for carrying out the operations in accordance with the present invention may be stored and distributed on a CD-ROM 216, diskette 218, access card 219, or other form of computer readable media capable of portably storing information. These storage media may be inserted into, and read by, devices such as the CD-ROM drive 214, the disk drive 212, card reader 215, etc. The software may also be transmitted to the computing arrangement 200 via data signals, such as being downloaded electronically via a network, such as local area network (casino, property, or bank network) or a wide area network (e.g., the Internet). Further, as previously described, the software for carrying out the functions associated with the present invention may alternatively be stored in internal memory/storage of the computing device 200, such as in the ROM 206.

The computing arrangement 200 is coupled to one or more displays 211, which represent a manner in which the gaming activities may be presented. The display 211 represents the "presentation" of the game information in accordance with the disclosure, and may be a mechanical display, or an electronic/video display such as liquid crystal displays, plasma displays, cathode ray tubes (CRT), digital light processing (DLP) displays, liquid crystal on silicon (LCOS) displays, etc., or any type of known display or presentation screen.

Where the computing device 200 represents a stand-alone or networked computer, the display 211 may represent a standard computer terminal or display capable of displaying multiple windows, frames, etc. Where the computing device 200 represents a mobile electronic device, the display 211 may represent the video display of the mobile electronic device. Where the computing device 200 is embedded within an electronic gaming machine, the display 211 corresponds to the display screen of the gaming machine/kiosk.

A user input interface 222 such as a mouse, keyboard/keypad, microphone, touch pad, trackball, joystick, touch screen, voice-recognition system, card reader, biometric scanner, RFID detector, etc. may be provided. The user input interface 222 may be used to input commands in the computing arrangement 200, such as placing wagers or initiating gaming events on the computing arrangement 200, inputting currency or other payment information to establish a credit amount or wager amount, inputting data to identify a player for a player loyalty system, etc. The display 211 may also act as a user input device, e.g., where the display 211 is a touchscreen device. In embodiments, where the computing device 200 is implemented in a personal computer, tablet, smart phone, or other consumer electronic device, the user interface and display may be the available input/output mechanisms related to those devices.

Chance-based gaming systems such as video poker machines, in which the present invention is applicable, are governed by random numbers and processors, as facilitated by a random number generator (RNG) or other random generator. The fixed and dynamic symbols generated as part of a gaming activity may be produced using one or more RNGs. RNGs may be implemented using hardware, software operable in connection with the processor 202, or some combination of hardware and software. The principles described herein are operable using any known RNG, and may be integrally programmed as part of the processor 202 operation, or alternatively may be a separate RNG controller 240 that may be associated with the computing arrangement 200 or otherwise accessible such as via a network. The RNGs are often protected by one or more security measures to prevent tampering, such as by using secured circuitry, locks on the physical game cabinet, and/or remote circuitry that transmits data to the gaming device.

The computing arrangement 200 may be connected to other computing devices or gaming machines, such as via a network. The computing arrangement 200 may be connected to a network server(s) 228 in an intranet or local network configuration. The computer may further be part of a larger network configuration as in a global area network (GAN) such as the Internet. In such a case, the computer may have access to one or more web servers via the Internet. In other arrangements, the computing arrangement 200 may be configured as an Internet server and software for carrying out the operations in accordance with the present invention may interact with the player via one or more networks. The computing arrangement 200 may also be operable over a social network or other network environment that may or may not regulate the wagering and/or gaming activity associated with gaming events played on the computing arrangement.

Other components directed to gaming machine implementations include manners of gaming participant payment, and gaming machine payout. For example, a gaming machine including the computing arrangement 200 may also include a payout controller 242 to receive a signal from the processor 202 or other processor(s) indicating a payout is to made to a player and controlling a payout device 244 to facilitate payment of the payout to the player. In some embodiments, the payout controller 242 may independently determine the amount of payout to be provided to the participant or player. In other embodiments, the payout controller 242 may be integrally implemented with the processor 202. The payout controller 242 may be a hopper controller, a print driver, credit-transmitting device, bill-dispensing controller, accounting software, or other controller device configured to verify and/or facilitate payment to a player.

A payout or payment device 244 may also be provided in gaming machine embodiments, where the payment device 244 serves as the mechanism providing the payout to the player or participant. In some embodiments, the payment device 244 may be a hopper, where the hopper serves as the mechanism holding the coins/tokens of the machine, and/or distributing the coins/tokens to the player in response to a signal from the payout controller 242. In other embodiments, the payout device 244 may be a printer mechanism structured to print credit-based tickets that may be redeemed by the player for cash, credit, or other casino value-based currency or asset. In yet other embodiments, the payout device 244 may send a signal via the network server 228 or other device to electronically provide a credit amount to an account associated with the player, such as a credit card account or player loyalty account. The computing arrangement 200 may also include accounting data stored in, for example, one of the memory devices 204, 206. This accounting data may be transmitted to a casino accounting network or other network to manage accounting statistics for the computing arrangement or to provide verification data for the currency or currency-based tickets distributed by the payout device, such as providing the data associated with the bar codes printed on the currency-based tickets so they are identifiable as valid tickets for a particular amount when the player redeems them or inserts them in another gaming device.

The wager input module or device 246 represents any mechanism for accepting coins, tokens, coupons, bills, electronic fund transfer (EFT), tickets, credit cards, smart cards, membership/loyalty cards, or any other player assets, for which a participant inputs a wager amount. The wager input device 246 may include magnetic strip readers, bar code scanners, light sensors, or other detection devices to identify and validate physical currency, currency-based tickets, cards with magnetized-strips, or other medium inputted into the wager input device. When a particular medium is received in the wager input device 246, a signal may be generated to establish or increase an available credit amount or balance stored in the internal memory/storage of the computing device 200, such as in the RAM 204. Thereafter, specific wagers placed on games may reduce the available credit amount, while awards won may increase the available credit amount. It will be appreciated that the primary gaming software 232 may be able to control payouts via the payment device 244 and payout controller 242 for independently determined payout events.

Among other functions, the computing arrangement 200 provides an interactive experience to players via an input interface 222 and output devices, such as the display 211, speaker 230, etc. These experiences are generally controlled by gaming software 232 that controls a primary gaming activity of the computing arrangement 200. The gaming software 232 may be temporarily loaded into RAM 204, and may be stored locally using any combination of ROM 206, drives 212, media player 214, or other computer-readable storage media known in the art. The primary gaming software 232 may also be accessed remotely, such as via the server 228 or the Internet.

The primary gaming software 232 in the computing arrangement 200 may be an application software module. According to embodiments of the present invention, this software 232 provides a poker game or similar game of chance as described herein. For example, the software 232 may present, by way of the display 211, representations of symbols to map or otherwise display as part of a poker-based game. However, in other embodiments, the principles of this concept may be applied to slot games or other types of games of chance. One or more aligned positions of these game elements may be evaluated to determine awards based on a pay table. The software 232 may include instructions to provide other functionality as known in the art or as described and shown herein.

The systems, apparatuses and methods operable via these and analogous computing and gaming devices can support gaming features as described herein. In one embodiment, a video poker game facilitates a random placement of at least one card enhancement identifier, that enables that card to be changed, upgraded, or otherwise made more beneficial or potentially more beneficial to the player. The enhancement identifier may be provided in any desired fashion, such as being randomly placed in connection with one (or more) cards of the one or more poker hands being played, may visually migrate onto the play area such as a falling raindrop, rising bubble, moving vehicle, etc. The current poker hand is played using the enhancement, and is played on one or more subsequent poker hands as the enhancer migrates on different poker deals.

Many embodiments may be described in terms of an electronic poker game, where presented cards potentially form a result(s) that conforms to a predetermined winning outcome to determine payout awards. However, the principles described herein are equally applicable to other games of chance, as described herein and as will be readily apparent to those skilled in the art from the teachings herein.

Video gaming embodiments may be implemented in a software/firmware-controlled processor (including single, multiple, distributed and/or other processing arrangements) where such processor-based software modules facilitate the payout enhancement (e.g., awards, award modifiers, game play enrichment, etc.) obtained through the inter-event migration of indicia identifying such payout enhancements.

Figure 3:
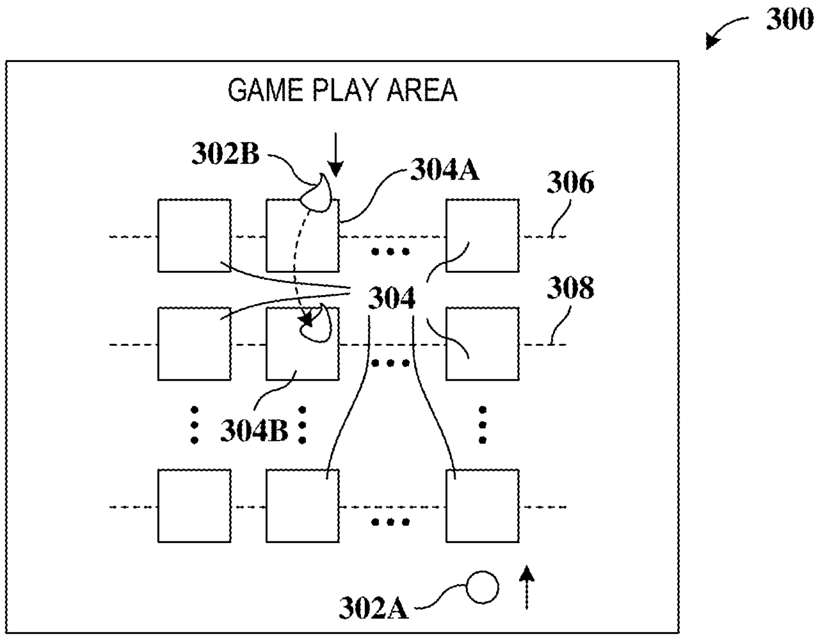
FIG. 3 depicts an embodiment of a gaming activity where game element enhancements are provided and migrated over a plurality of gaming events within the game play area.

FIG. 3 depicts an embodiment of a gaming activity where one or more game element enhancements 302A/302B are provided and migrated among game elements 304 within the game play area 300, over a plurality of gaming events. The game elements 304 may represent, for example, bingo squares, poker cards, slot symbols, keno number positions, etc. Game enhancement 302A represents an example of a game enhancement that may be randomly positioned about the game play area 300 by advancing from the bottom of the game play area 300 upwards. For example, the game enhancement 302A could represent a bubble rising in the game play area 300 to reach at least one of the game elements 304. Another representative example is a game enhancement 302B that could represent a raindrop or other item falling in the game play area 300 to reach at least one of the game elements 304.

For example, the game enhancement 302B is depicted as becoming associated with game element 304A. In one embodiment, that association may cause element 304A to be enhanced in some way, such as being converted to exhibit wild functionality, and/or provide a payout multiplier or other modifier, etc.

In one embodiment, the game play area 300 may represent a multi-hand poker game. The random placement of the game enhancement 302B causes the card (i.e. element 304A) to convert to a Wild card that can represent any card in the poker deck. Thus, this would potentially increase the player's ability to obtain a winning hand for the hand shown online 306. In other representative embodiments, the random placement of the game enhancement 302 be may cause a multiplier to be associated with that card/element 304A, whereby a payout provided for the hand on line 306 would be multiplied by that multiplier. In other embodiments, such a multiplier may enhance payouts on one or more additional hands, up to all of the hands. In some embodiments, both a Wild and multiplier functionality are provided. These and other enhancements may be implemented in connection with the disclosure provided herein.

In one embodiment, when the one or more gaming events provided via the game play area 300 have been played, such as one or more poker hands played to their completion using the one or more enhancements 302A/302B, the enhancement 302A/302B migrates or otherwise relocates to another (at least) one of the game elements 304. For example, in a poker context, on the next (or any subsequent, but in one embodiment the next) poker deal, whether that be a single hand or multiple hands, the game enhancement 302B may move downward to reach game element 304B. This would again cause the card (i.e. element 304B) to convert to a Wild card, and/or multiplier, and/or other defined enhancer, to potentially increase the player's ability to obtain a winning hand for the hand shown on line 308 and/or increase a payout that might occur. In this manner, hands can be benefitted over a plurality of discrete gaming events (e.g., poker deals/hands), to potentially benefit the player's gaming outcome.

In one embodiment, rather than the benefit being a Wild card, multiplier, or other independent game enhancement, it could be a card/game element upgrade that is dependent on other game elements 304. For example, in a poker context, if the game enhancement 302B is randomly presented at game element 304A, the upgrade to the card might be changed to correspond more closely to the poker suit, rank, etc. of other cards in the hand on line 306. For example, in a draw poker context, if three cards of the five cards in a poker hand (line 306) were Royal Flush cards, the card 304A may be changed to another card of that suit that would be in line with that Royal Flush, leaving just one card to draw to a Royal Flush. Thus, in some embodiments, the card may be modified in a manner that is dependent on other cards/game elements in the game play area 300.

Figure 4:
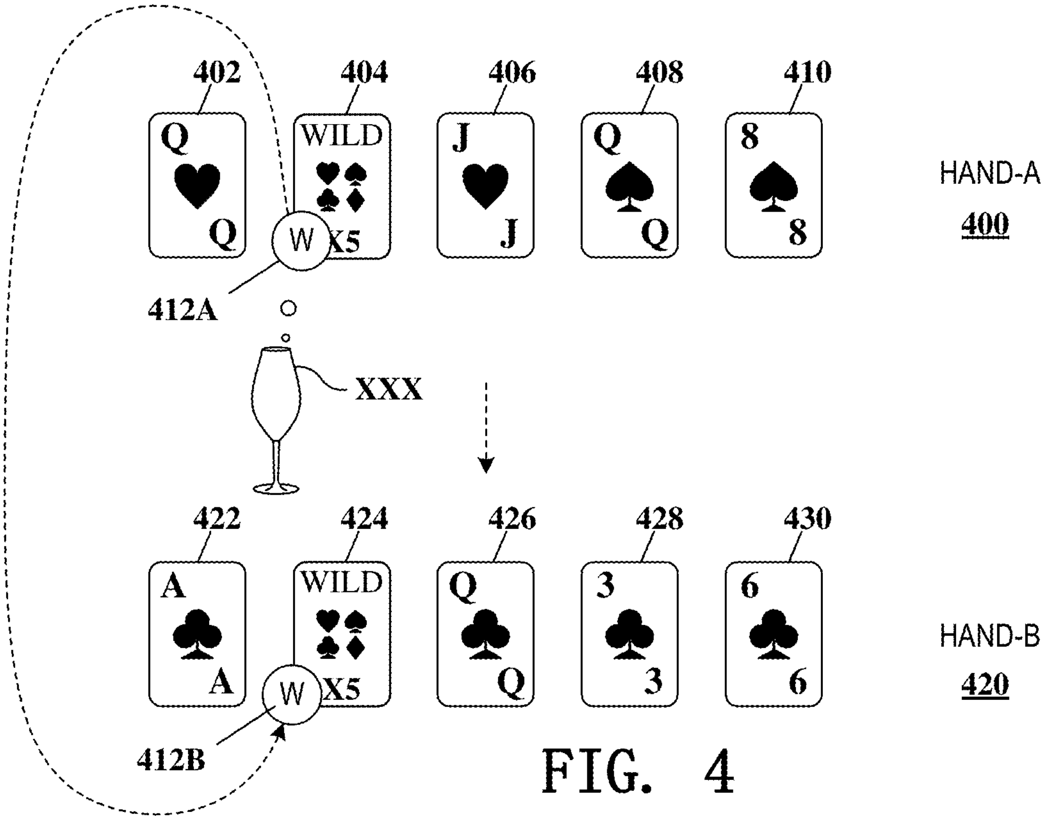
FIG. 4 is an example illustrating a single-hand stud or draw poker embodiment whereby a card enhancement indicator spans multiple poker deals.

FIG. 4 is an example illustrating a single-hand stud or draw poker embodiment whereby a card enhancement indicator spans multiple poker deals. A first representative hand, shown as hand-A 400, includes cards 402, 404, 406, 408, and 410. The hand 400 is depicted with a random enhancement indicator, a Wild card indicator 412A provided via a bubble in this example, having risen onto a card 404. Card 404 may be changed to a Wild card with a multiplier as in the example of FIG. 4. Thus, after receipt of the Wild card indicator 412A, the player can use the newly-provided Wild card 404 to create the resulting poker hand, which provides three-of-a-kind (three Queens) in the present example using the resulting Wild card 404.

In one embodiment, the Wild indicator 412A migrates to another poker hand, which in a single-hand game migrates to the same (or in other embodiments a different) card position in the next hand-B 420, as depicted by the migrated Wild indicator 412B. As was the case in the prior hand-A 400, the associated card is converted, in this example again to a Wild card with multiplier 424, thereby resulting in a flush of Clubs as the result. The migration of the Wild indicator 412B may continue further, until is stops randomly, or after a fixed or random count, or in connection with some termination trigger, etc.

Thus, the disclosure may be implemented in a single-hand video poker embodiment. In one embodiment, betting structure may be implemented as desired, whereby the cost to participate in the enhancement features described herein may be built into the normal cost per hand or per game, or may involve an additional single wager, or may involve an additional wager per hand played, etc. In one example, a wager to play a single-hand poker hand may be five credits, and an additional one credit is paid to participate in the enhancement features described herein, or an additional one credit per hand may be involved to participate in the enhancement features for multi-hand versions. Thus, a representative betting structure that could be used in the embodiment of FIG. 4 may be, for example, a 5+5 structure for a total of ten credits (e.g., five credits to play the hand, plus five credits to be eligible for the award enhancement feature for that hand). Any credit structure desired to accommodate the math to provide payouts at the desired rate may be employed. Bubbles or other indicators randomly become available, and may float up to a card(s) where they are wild, wild multipliers, cards involved in special features such as card duplication, split cards, and/or the like. The hand is played, and on the next game the bubble may float up one position, which in a single-hand embodiment may go off the display screen and come back around to provide the card upgrade feature multiple times in a row or otherwise multiple times for any future hands.

Figure 5A:
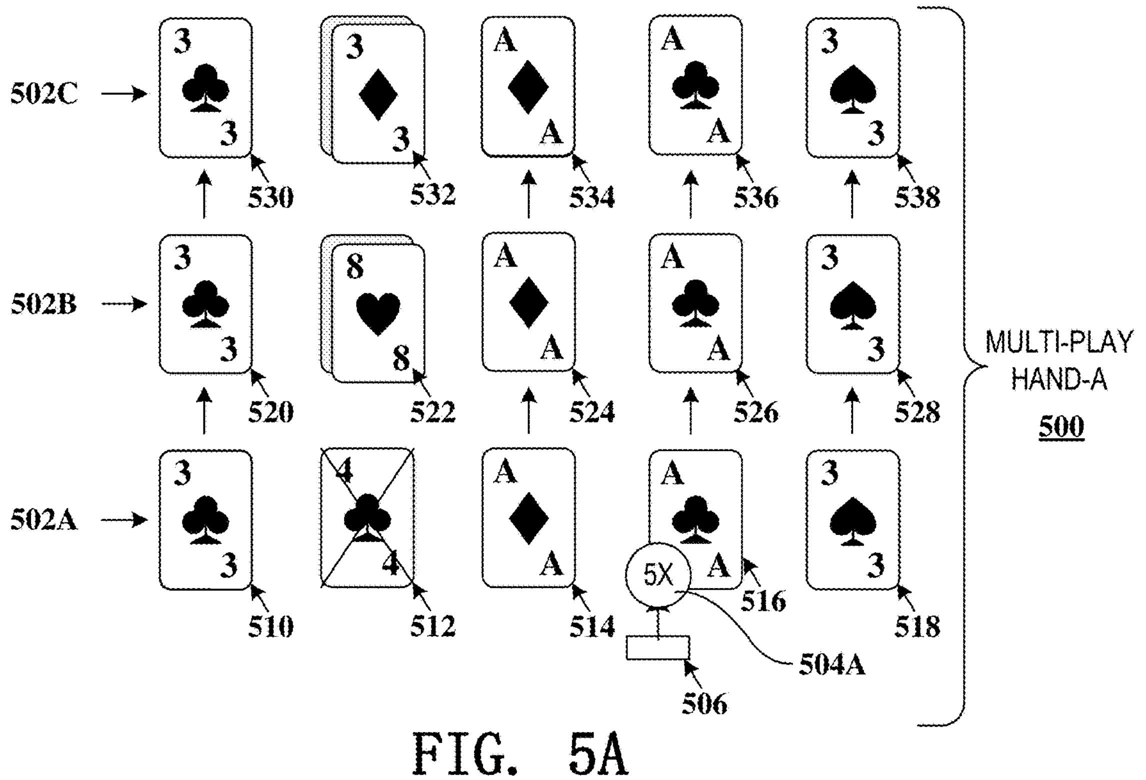
FIGS. 5A and 5B depict a multi-play poker embodiment, where a card enhancement indicator spans multiple poker deals, and migrates within the hands of the multi-play game area.
Figure 5B:
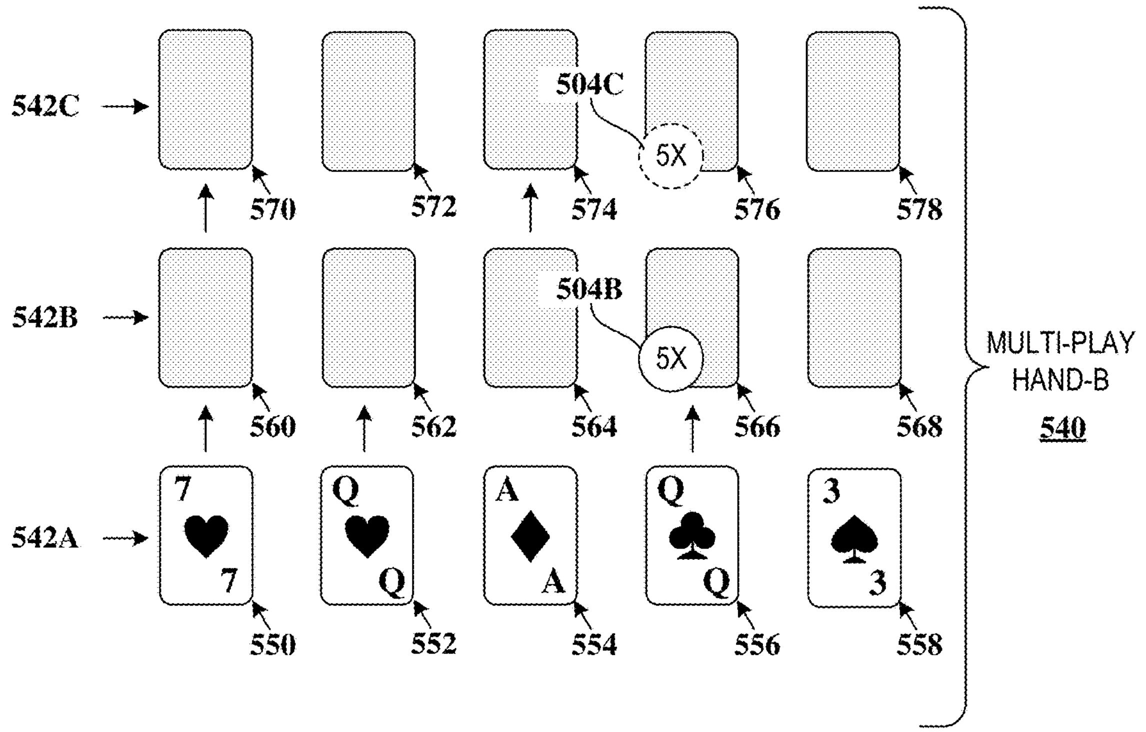

FIGS. 5A and 5B depict a multi-play poker embodiment, where a card enhancement indicator spans multiple poker deals, and migrates within the hands of the multi-play game area. A multi-play hand-A 500 is played, which includes an initial deal of a hand 502A, and two more (in this example) hands 502B, 502C. In one embodiment, cards held in the initial hand 502A are replicated into corresponding card positions of other hands 502B, 502C (although the cards could be replicated into any of the card positions of the other hands 502B, 502C). After cards are drawn, into the non-held card positions, final hands result for each of the hands 502A, 502B,502C.

The example of FIGS. 5A and 5B operates substantially the same as that of FIG. 4, the exception that multiple hands are played concurrently. Thus, a first multi-play hand-A 500 of poker is dealt, which is assumed to be a triple-play (i.e. three concurrently-played hands) 5-card draw poker game for purposes of this example. In this example, the enhancement item may be provided via a bubble or other migrating enhancement element 504A that may randomly materialize, or may be provided from a source 506, etc. In this example, the enhancement element 504A is provided from a source 506, and rises through a column of cards on subsequent hands 500, 540. In the first hand 500, card 516 receives the benefit of the enhancement element 504A. The player held cards 510, 514, 516 and 518 which were replicated into hand 502B as cards 520, 524, 526 and 528, and into hand 502C as cards 530, 534, 536 and 538. Each hand 502A, 502B, 502C resulted in two pair (Aces and Threes), but hand 502A will be enhanced by the 5X multiplier 504A.

In one embodiment, the 5X multiplier 504A migrates upward on each successive hand played. Therefore, for multi-play hand-B 540, the 5X multiplier 504B has moved upward to the next hand 542B. In this draw poker embodiment, when the hands 542A, 542B, 542C are played out, any payout obtained in connection with hand 542B will be multiplied by five as a result of the multiplier 504B. On the next played poker hands, the 5X multiplier 504C will move to the next hand 542C, and so on. The multiplier 504C may "wrap around" and be used again on the next hand and start the process over, or the feature may end when the multiplier 504C has reached the last hand 542C, or the feature may end when a timer expires or an event occurs, etc.

Thus, one multi-hand poker format may be, as in the example of FIGS. 5A/5B, a triple-play draw poker embodiment. Betting structure may be implemented as desired, whereby the cost to participate in the enhancement features described herein may be built into the normal cost per hand or per game, or may involve an additional single wager, or may involve an additional wager per hand played, etc. For example, in a triple-play version such as shown in FIGS. 5A and 5B, three hands are dealt, where the player would hold cards in one of those hands that would be replicated in the other hands. A representative betting structure may be, for example, a 5+5 structure for a total of thirty credits (e.g., five credits to play each of the three hands, plus five credits to be eligible for the card enhancement feature for each of the three hands). Bubbles or other indicators may come out, and float to a card position(s) where they serve as a Wild card, Wild card with multiplier, multiplier only, etc. After participating in that multi-play hand, the bubble floats up (or in another direction) to arrive at another card in which it will again serve as a Wild card, Wild card with multiplier, multiplier only, etc. In other embodiments, the bubble may float more than one position, in other directions, randomly move, etc.

Figure 6:
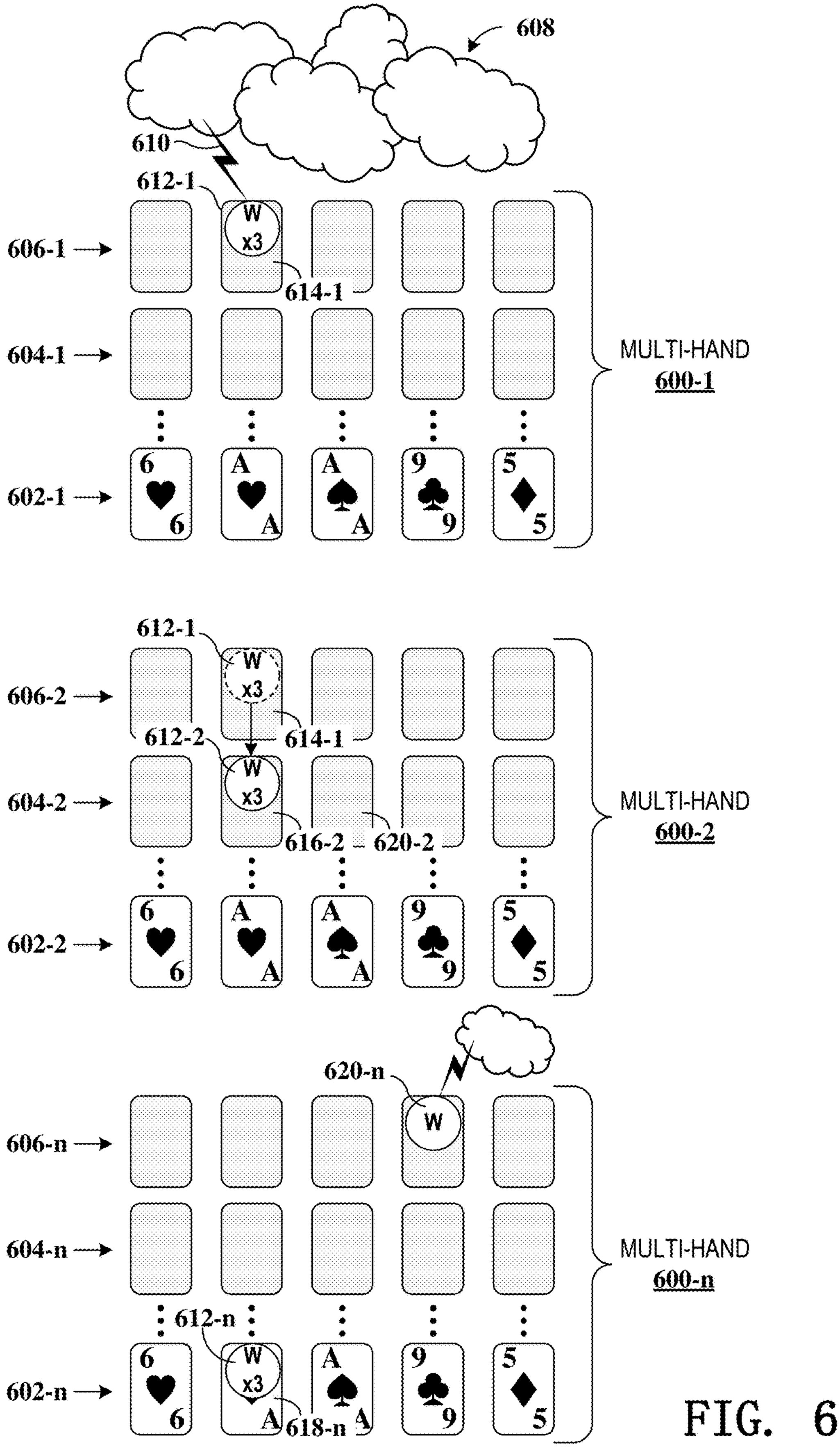
FIG. 6 depicts another example of a sequence of multi-hand poker games, where a poker hand enhancement migrates through the multiple hands on successive poker games.

FIG. 6 depicts another example of a sequence of multi-hand poker games, where a poker hand enhancement migrates through the multiple hands on successive poker games. In this example, the migration of a poker hand enhancement moves from a top hand of the multi-hand poker game to a bottom hand of the multi-hand poker game over a sequence of "n" poker games.

A first multi-hand poker game 600-1 (e.g. a multi-play poker game where multiple hands are concurrently played) includes some number of concurrently-played hands 602-1, 604-1, 606-1, which represents at least three and up to a finite number of concurrently-played poker hands. In this embodiment, a lightning bolt(s) 610 from a cloud 608 may randomly designate a card position of the top hand 606-1. In this embodiment, the poker hand enhancement may be a wild card, wild card with multiplier, multiplier, etc. The resulting poker hand enhancement for multi-hand 600-1 is a wild card with 3× multiplier 612-1 at card position 614-1. It is assumed the player plays out the multi-hand 600-1 poker game, using a wild card at card position 614-1, and multiplying any resulting payout from hand 606-1 by three. In other embodiments, the multiplier may be applied to one, more, or all of the payouts from the additional hands 604-1, 602-1.

On the next successive multi-hand poker game 600-2, the wild card with 3× multiplier 612-1 from card position 614-1 has moved to a corresponding card position 616-2 in a next (lower in this example) hand 604-2, as depicted by wild card with 3× multiplier 612-2 at card position 616-2. Again, the player would play out the multi-hand 600-2 poker game, using a wild card at card position 616-2, and multiplying any resulting payout from hand 604-2 by three.

This would continue, in one embodiment, until each of the multiple hands in the multi-hand poker games received and used the wild card with multiplier. This is depicted at multi-hand **600-*n*, representing the last multi-hand poker game where the wild card with 3× multiplier 612-*n* has migrated to the corresponding card position 618-*n* for use by hand 602-*n*. Thus, the player would play out the multi-hand 600-*n* poker game, using the wild card 612-*n* at card position 618-*n*, and multiplying any resulting payout from hand 602-*n*** by three. In some embodiments, a termination event could stop the use of the poker hand enhancement before all hands in successive poker games were able to use the poker hand enhancement.

In some embodiments, additional poker hand enhancements may occur while another one (or more) poker hand enhancements are already active. For example, a wild card **620-*n* may occur to begin another migration through the multiple hands over a series of the poker games, while the wild card with 3× multiplier 612-*n* is still active, thereby providing multiple active wild cards 612-*n*, 620-*n* at one time, which would potentially increase the chances of obtaining a winning poker hand result and/or increase the payout for hands 602-*n* and 606-*n***.

In other embodiments, the poker hand enhancement does not migrate to corresponding card positions on successive poker games, but rather moves to any other position of the next poker hand, or a patterned position on the next poker hand, etc. For example, the wild card with 3× multiplier **612-*n* could have instead randomly moved to any other card position of hand 602-*n*. As another example, the wild card with multiplier 612-1 at multi-hand 600-1 may move both down and to the right on the next multi-hand 600-2, such as at card position 620-2 rather than card position 616-2**, etc. Thus, while some embodiments involve migrating the poker hand enhancement(s) to corresponding card positions of adjacent hands on successive poker games, other embodiments allow the migrating poker hand enhancement(s) to move to non-corresponding card positions of adjacent hands on successive poker games.

In some embodiments, the poker hand enhancement(s) does not begin on a hand that is positioned at an edge of an array of the plurality of poker hands. For example, for multi-hand 600-1, hand 606-1 is at the "top" of the array of the indefinite number of poker hands played, and hand 602-1 is at the "bottom" of the array, which are thus at "edges" of the array of poker hands. The array of poker hands in this context refers to the group of poker hands being played in the multi-hand fashion, thereby forming the game play area (e.g. see game play area 300 of FIG. 3). In some embodiments, the poker hand enhancement(s) does not begin on a hand that is positioned at an edge of an array of the plurality of poker hands, but rather begins in a hand not on the edge of the array, or begins on any random hand, etc. For example, the first wild card with 3× multiplier 612-1 could instead first be provided at a card position of hand 604-1 or other non-edge poker hand.

As previously noted, betting structure may be implemented as desired, whereby the cost to participate in the enhancement features described herein may be built into the normal cost per hand or per game, or may involve an additional single wager, or may involve an additional wager per hand played, etc. For example, in a triple-play version such as shown in FIGS. 5A and 5B, three hands are dealt, where the player would hold cards in one of those hands that would be replicated in the other hands. A representative betting structure may be, for example, a 5+5 structure for a total of thirty credits (e.g., five credits to play each of the three hands, plus five credits to be eligible for the player benefit features described herein for each of the three hands). However, the betting structure may be managed in any way desired, such as 5+1, 5+2, 5+3, 5+4, 5+5, 5+45, etc.

Some embodiments may also be employed to determine whether an indication to provide a poker hand benefit(s) will be active (thereby enabling the poker hand benefit) or passive (not enabling the poker hand benefit). For example, the player may place additional wagers to activate card positions or card columns or hands, etc. If the sub-symbols or other indicators are randomly or otherwise provided in an activated card position or column or hand, the indicator will be active, thereby enabling the migrating enhancement feature. In such a case, there might be no additional general wager to be eligible for the disclosed features, but rather (or additionally) the additional wager(s) is to make eligible certain portions (subset or the entire set) of card positions in which received indicators activate the poker hand benefit features described herein.

Figure 7A:
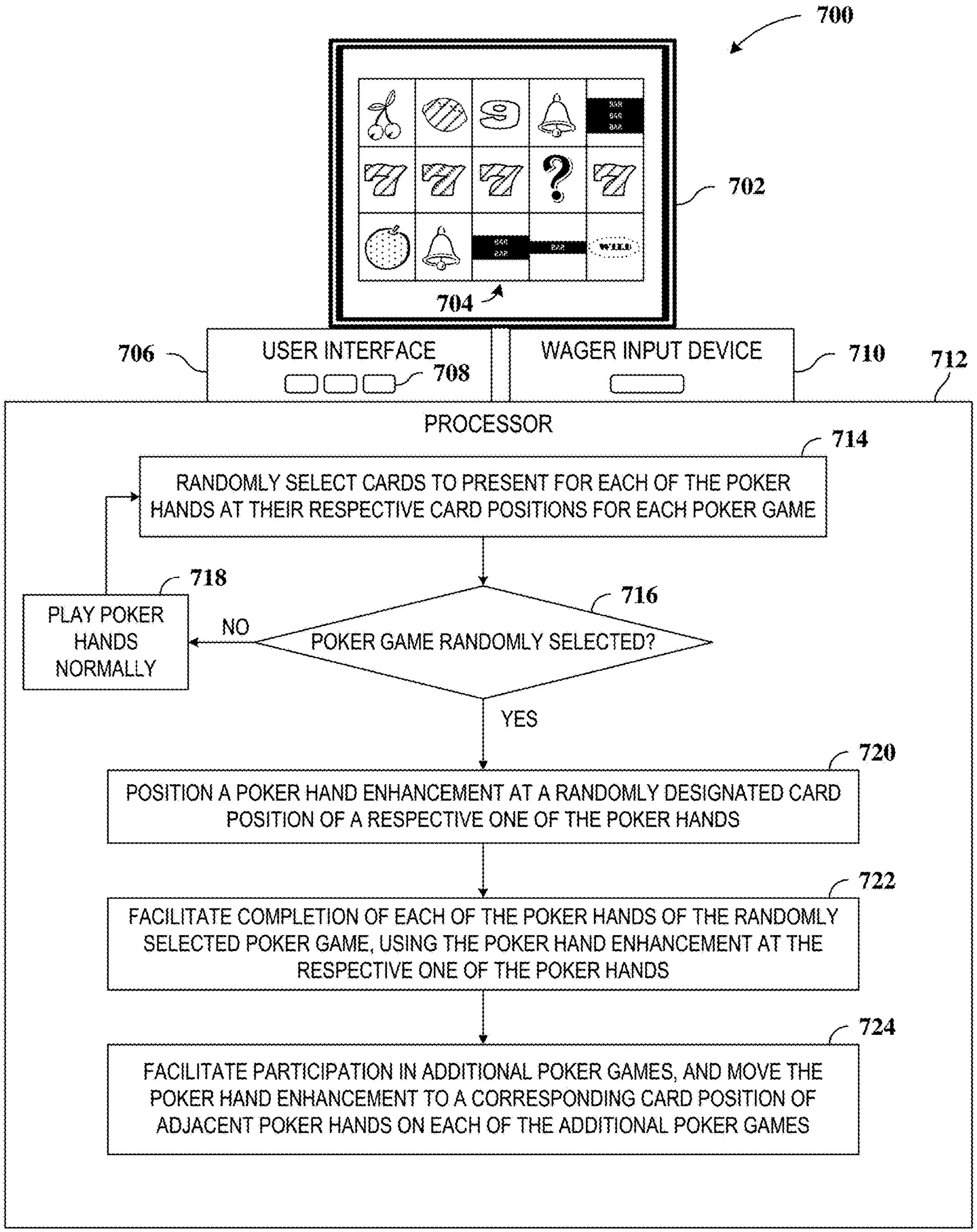
FIGS. 7A, 7B and 7C are diagrams of representative electronic poker devices for enhancing the likelihood of favorable gaming outcomes and/or increasing payouts associated therewith using migrating enhancements described herein.
Figure 7B:
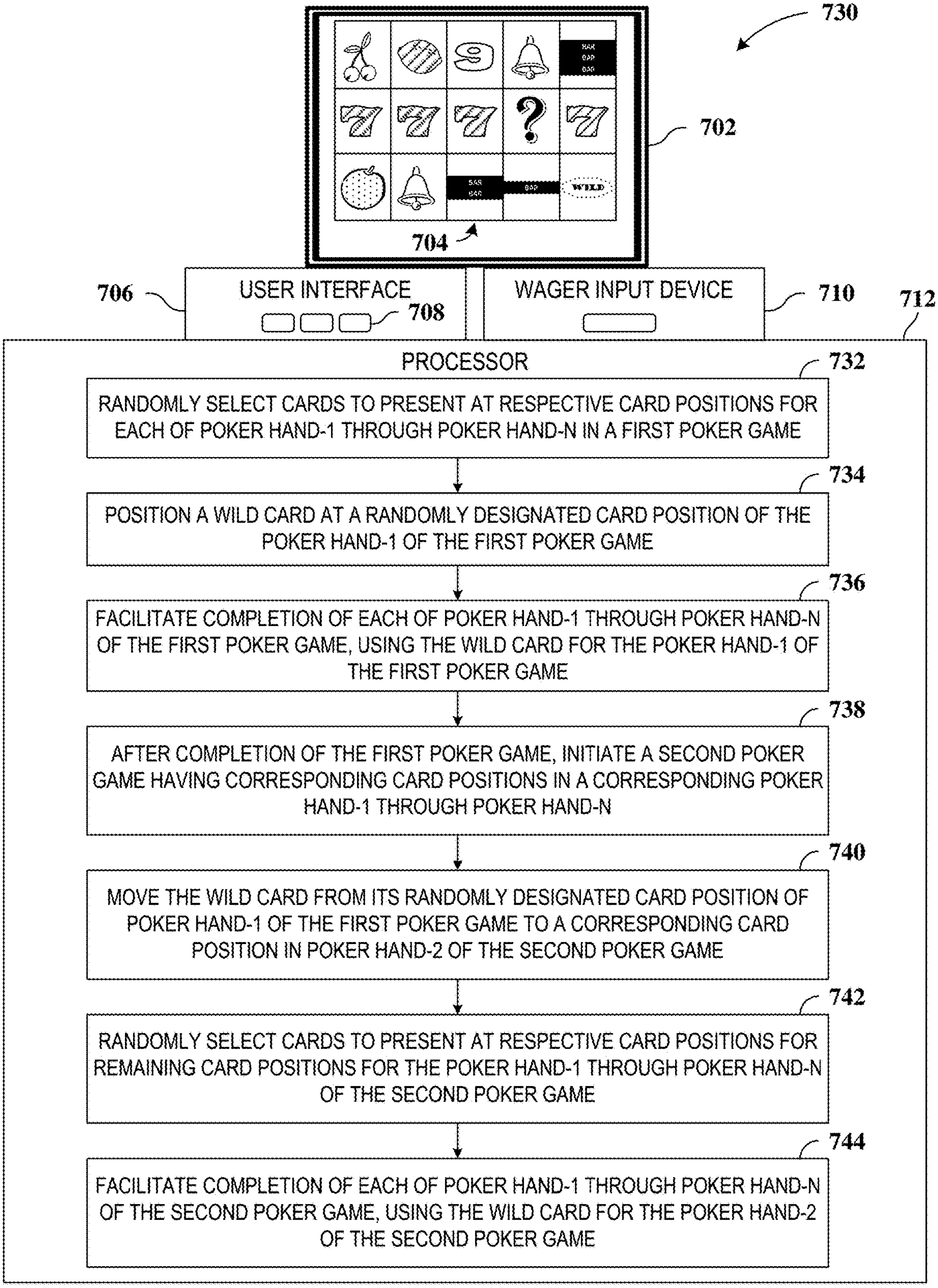
Figure 7C:
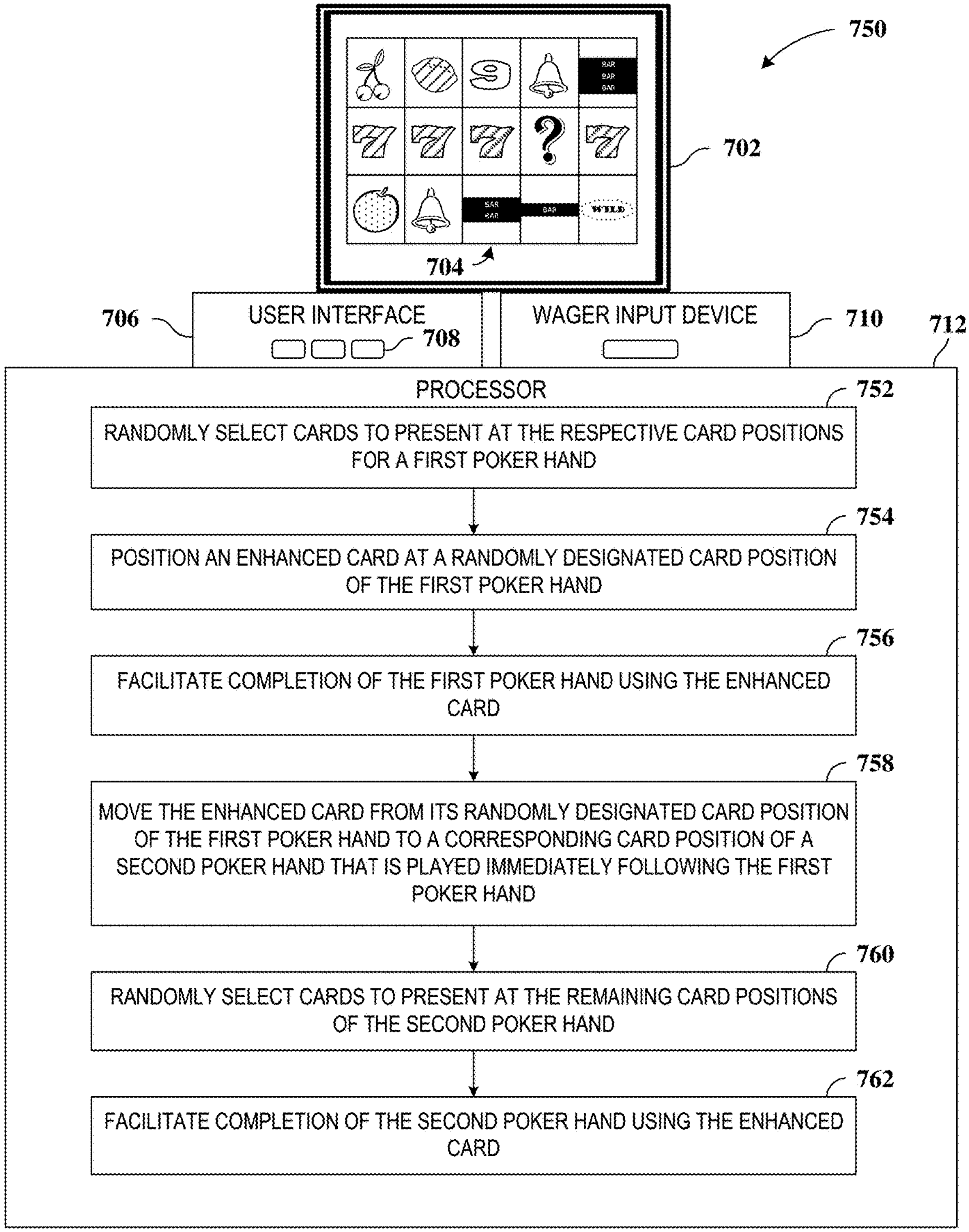

FIGS. 7A, 7B and 7C are diagrams of representative electronic poker devices for enhancing the likelihood of favorable gaming outcomes and/or increasing payouts associated therewith in accordance with the principles set forth herein. In the embodiment of FIG. 7A, a gaming device 700 for playing an electronic poker game is provided. The representative gaming device 700 includes at least a display(s) 702 presenting a single or multiple poker hands 704. A user interface 706 is provided that includes at least one user input 708 to enable a player to initiate and participate in poker hands 704 presented via the display 702. A wager input device 710 may be provided, which may be structured to identify and validate player assets and ultimately permit the player to play the poker games/hands when the player assets are provided.

A processor 712 is configured to, in one embodiment, randomly select 714 cards to present for each of the plurality of poker hands at their respective card positions for each of the poker games. If a particular played poker game is not randomly selected as determined at decision block 716, the poker hands are played 718 normally in one embodiment, without the benefit of the poker hand enhancement(s) described herein. On the other hand, if the poker game was randomly selected (e.g. a random indicator occurring), a poker hand enhancement is positioned 720 at a randomly designated card position of a respective one of the poker hands. The processor 712 is further configured to facilitate 722 completion of each of the poker hands of the randomly selected poker game, using the poker hand enhancement at the respective poker hand. The processor 712 is further configured to facilitate 724 participation in additional poker games, and move the poker hand enhancement to a corresponding one of the card positions of adjacent poker hands on each of the additional poker games.

In the embodiment of FIG. 7B, a gaming apparatus 730 for playing an electronic poker game is provided. Utilizing like reference numbers to those of FIG. 7A where applicable, the representative gaming apparatus 730 includes at least a display(s) 702 presenting a single or multiple poker hands 704. A user interface 706 is provided that includes at least one user input 708 to enable a player to initiate and participate in poker hands 704 presented via the display 702. A wager input device 710 may be provided, which may be structured to identify and validate player assets and ultimately permit the player to play the poker game events when the player assets are provided.

The processor 712 is configured, in one embodiment, to randomly select 732 cards to present at respective card positions for each of poker hand-1 through poker hand-N in a first poker game, to position 734 a wild card at a randomly designated card position of the poker hand-1 of the first poker game, and to facilitate 736 completion of each of poker hand-1 through poker hand-N of the first poker game using the wild card for the poker hand-1 of the first poker game. After completion of the first poker game, the processor 712 initiates 738 a second poker game having corresponding card positions in a corresponding poker hand-1 through poker hand-N. The processor 712 is configured to move 740 the wild card from its randomly designated card position of poker hand-1 of the first poker game to a corresponding card position in poker hand-2 of the second poker game. The processor 712 is configured to randomly select 742 cards to present at respective card positions for the remaining card positions for the poker hand-1 through poker hand-N of the second poker game, and facilitate 744 completion of each of poker hand-1 through poker hand-N of the second poker game, using the wild card for the poker hand-2 of the second poker game. This may continue for any number of poker games and number of hands within the poker games.

In the embodiment of FIG. 7C, a gaming apparatus 750 for playing an electronic poker game is provided, which in one embodiment is a single-hand poker game. Utilizing like reference numbers to those of FIGS. 7A and 7B where applicable, the representative gaming apparatus 750 includes at least a display(s) 702 presenting a single or multiple poker hands 704. A user interface 706 is provided that includes at least one user input 708 to enable a player to initiate and participate in poker hands 704 presented via the display 702. A wager input device 710 may be provided, which may be structured to identify and validate player assets and ultimately permit the player to play the poker game events when the player assets are provided.

The processor 712 is configured, in one embodiment, to randomly select 752 cards to present at respective card positions for a first poker hand, to position 754 an enhanced card at a randomly designated card position of the first poker hand, and to facilitate 756 completion of the first poker hand using the enhanced card. The processor 712 is configured to move 758 the enhanced card from its randomly designated card position of the first poker hand to a corresponding card position of a second poker hand played immediately after the first poker hand. The processor 712 is configured to randomly select 760 cards to present at the remaining card positions of the second poker hand, and to facilitate 762 completion of the second poker hand using the enhanced card.

Figure 8A:
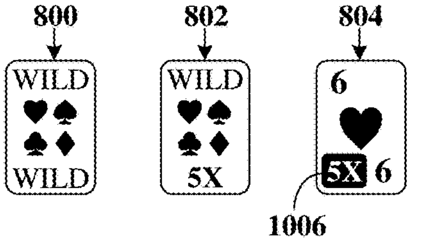
FIGS. 8A-8C depict examples of representative types of poker card enhancements that may be provided on eligible poker hands.
Figure 8B:
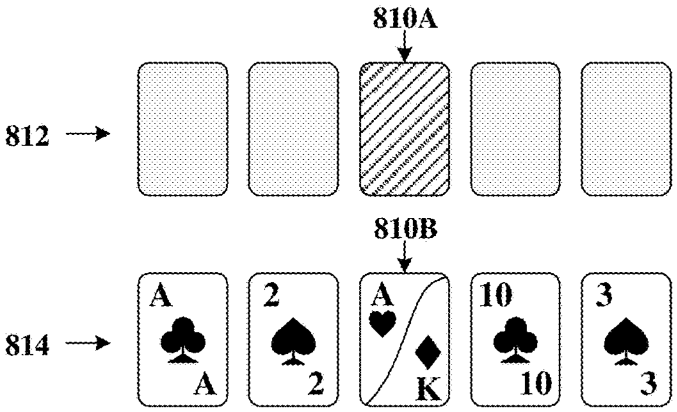
Figure 8C:
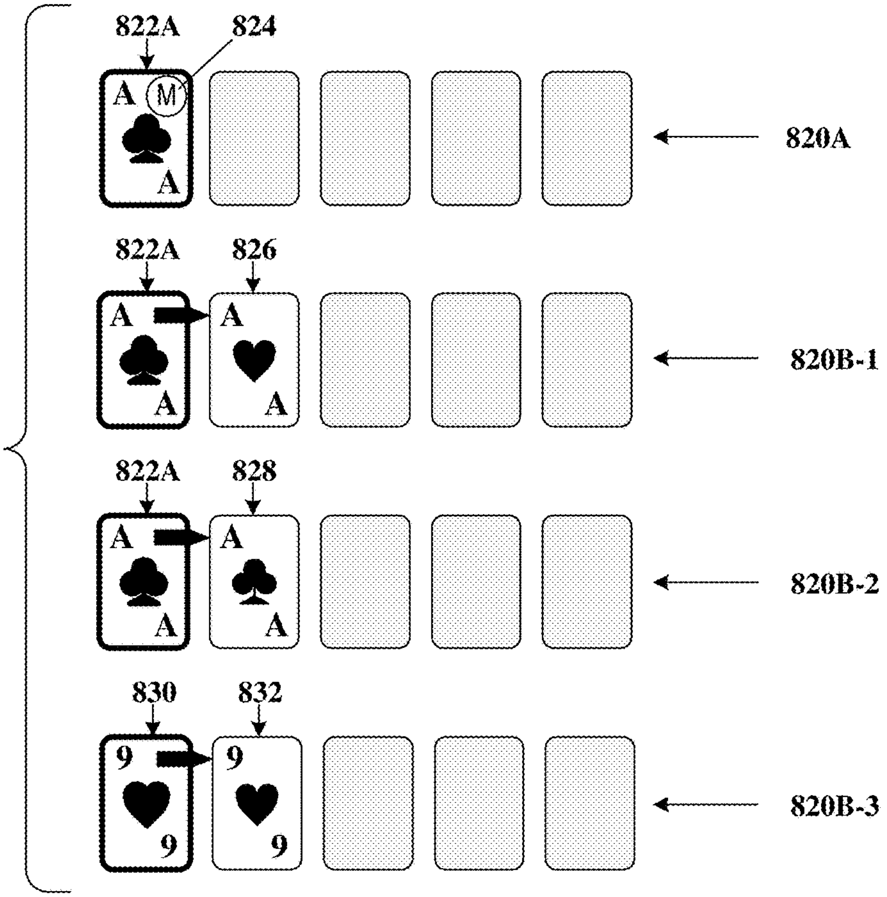

FIGS. 8A-8C depict examples of representative types of poker card enhancements that may be provided on eligible poker hands. Those examples in FIGS. 8A-8C are merely representative examples, and other manners of enhancing cards or hands may alternatively or additionally be employed.

FIG. 8A depicts some examples described previously herein, including Wild cards 800, Wild cards with a multiplier 802 or other modifier, and cards 804 providing a multiplier 806 or other modifier. Some embodiments have a single enhancement card (e.g. Wild cards 800), where other embodiments may allow the use of two or more enhancement cards such as randomly selecting between a Wild card 800, Wild card with multiplier 802, and a multiplier 806. In the case of multipliers (e.g. cards 802, 804), an awarded multiplier in a hand may be applied to the hand in which the card 802, 804 is provided, or in other embodiments may be applied to all hands of the poker game, etc.

FIG. 8B depicts another example of a card enhancement that may be provided on an eligible poker hand. This embodiment represents a Split Card embodiment, where multiple cards may occupy a card position, which is also described U.S. Pat. No. 8,323,085, entitled "Method And Apparatus For Increasing Potential Payout Opportunities In Card Games," issued Dec. 4, 2012, the content of which is hereby incorporated by reference in its entirety. For example, an indicator may mark card position 810A in a first poker game/hand 812, where the enhanced card provided to that card position 810B in the subsequent game/hand 814 is a Split Card. In this example, the Split Card represents both an Ace of Hearts and a King of Diamonds, thereby providing the player with the benefit of having either or both of those cards at the player's disposal to enhance a result and/or payout for hand 814.

FIG. 8C depicts another example of a card enhancement that may be provided on an eligible poker hand. This embodiment represents a Mirror Card embodiment, where a card may be replicated within a hand or to another hand. For example, an enhanced card may be provided to card position 822A of poker hand 820A, which is designated as a Mirror Cards (e.g., a particular card, or provided with some indicia 824 indicating such, etc.). One available result for such a Mirror Card is shown at hand 820B-1, which represents a next stage upon receiving such a Mirror Card at card position 822A. Particularly, hand 820B-1 shows Mirror card 822A being replicated or "mirrored" into another card at an adjacent card position 826. In one embodiment depicted at hand 820B-1, the card that receives the benefit of the mirror card is a card of the same rank but not card suit (e.g. An Ace is mirrored to any other suited Ace). In another example, hand 820B-2 shows Mirror card 822A being replicated into another card at an adjacent card position 828. In this embodiment, the card that receives the benefit of the mirror card is a card of the same rank and suit (e.g. an Ace of Clubs is mirrored to an Ace of Clubs). In another example, hand 820B-3 shows Mirror card 830 being replicated into another card at an adjacent card position 832. In this embodiment, the mirror card may change from the card at the triggering card position 822A of hand 820A, such as changing to a 9 of Hearts at card position 830, while enabling that card to be mirrored into an adjacent card position 832. Again, the examples of FIGS. 8A-8C are provided to show representative enhanced cards, although any other enhanced cards or enhancement techniques may alternatively or additionally be employed.

The principles described herein may be applied to other games, such as keno, bingo, etc. For example, in the context of keno, particular number positions (whether associated with positions of the player's identified numbers or not) may be randomly identified with a bubble or other enhancement indicator. Number positions may be marked as Wild, be associated with multipliers, etc. A wild function could make any player-identified number correspond to a number selected in the keno game, and multipliers could instead or alternatively be used to increase payouts. Similar examples apply to games such as bingo, where a bingo card position may be marked as wild, and the current and/or subsequent bingo games treat the marked position as a free space (similar to the middle position in many bingo games), and/or provided with multipliers, etc. In such games, the enhanced game play position(s) may migrate in a direction to be used for the next gaming event. These and other applications of the enhancement features described herein may be employed.

The foregoing description of the representative embodiments has been presented for the purposes of illustration and description. It is not intended to be exhaustive or to limit the invention to the precise form disclosed. Many modifications and variations are possible in light of the above teaching. For example, the present invention is equally applicable in electronic or mechanical gaming machines, and is also applicable to live table versions of gaming activities that are capable of being played in a table version (e.g., machines involving poker or card games that could be played via table games).

Some embodiments have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention covers alternatives, modifications, and equivalents that come within the scope and spirit of the principles set out herein and/or in the appended claims.

What is claimed is:

1. An electronic poker device for playing poker games, comprising:

a display configured to present a plurality of vertically aligned poker hands each having a plurality of cards presented at respective card positions for each of the poker games;

a user interface configured to at least enable player interaction with each of the poker games; and a processor configured to:

initiate a first poker game in response to a signal received from the user interface;

position a poker hand enhancement at a randomly designated one of the card positions of a respective one of the plurality of vertically aligned poker hands;

randomly select cards to present in respective card positions of a first poker hand among the plurality of vertically aligned poker hands;

copy any cards held in the first poker hand to corresponding card locations in the remaining plurality of vertically aligned poker hands;

replace any non-held cards in the first poker hand with randomly selected new cards and randomly complete any empty card positions in the remaining poker hands with randomly selected cards in response to a signal received from the user interface;

evaluate each of the plurality of vertical poker hands for awards using the poker hand enhancement at the respective one of the plurality of poker hands; and facilitate participation in one or more additional ones of the poker games, and move the poker hand enhancement to a corresponding one of the card positions of a vertically adjacent ones of the plurality of poker hands on each of the one or more additional ones of the poker games.

2. The electronic poker device of claim 1, wherein the poker hand enhancement includes a multiplier to increase a payout on the poker hand in which the poker hand enhancement is used.

3. The electronic poker device of claim 1, wherein the poker hand enhancement includes a wild card.

4. The electronic poker device of claim 3, wherein the poker hand enhancement further includes a multiplier to increase a payout on the poker hand in which the poker hand enhancement is used.

5. The electronic poker device of claim 1, wherein the processor is further configured to position one or more additional ones of the poker hand enhancements at respectively randomly designated ones of the card positions of the plurality of poker hands.

6. The electronic poker device of claim 1, wherein the processor is further configured to move the poker hand enhancement to the corresponding one of the card positions of vertically adjacent ones of the plurality of poker hands on each successive one of the poker games until each of the plurality of poker hands has used the poker hand enhancement.

7. The electronic poker device of claim 1, wherein the processor is further configured to position the poker hand enhancement at the randomly designated one of the card positions of the poker hand that is positioned at a bottom poker hand of the vertically aligned plurality of poker hands.

8. The electronic poker device of claim 7, wherein the processor is further configured to, on a next additional one of the poker games, move the poker hand enhancement to the corresponding one of the card positions on the poker hand adjacently above the bottom poker hand.

9. The electronic poker device of claim 8, wherein the processor is further configured to, on each additional one of the poker games, move the poker hand enhancement to the corresponding one of the card positions on the poker hand adjacently above the poker hand where the poker hand enhancement was previously used, until the poker hand enhancement has been used by the highest one of the vertically aligned poker hands.

10. The electronic poker device of claim 7, wherein the processor is further configured to cause the display to move the poker hand enhancement from a position outside of the plurality of poker hands to the randomly designated one of the card positions of the bottom poker hand.

11. The electronic poker device of claim 7, wherein the processor is further configured to cause the display to move a visible item from a position outside of the plurality of poker hands to designate the randomly designated one of the card positions of the bottom poker hand, and to place a wild card as the poker hand enhancement at the randomly designated one of the card positions designated by the visible item.

12. The electronic poker device of claim 1, wherein the processor is further configured to position the poker hand enhancement at the randomly designated one of the card positions of the poker hand that is positioned at a top poker hand of the vertically aligned plurality of poker hands.

13. The electronic poker device of claim 12, wherein the processor is further configured to, on a next additional one of the poker games, move the poker hand enhancement to the corresponding one of the card positions on the poker hand adjacently below the bottom poker hand.

14. The electronic poker device of claim 13, wherein the processor is further configured to, on each additional one of the poker games, move the poker hand enhancement to the corresponding one of the card positions on the poker hand adjacently below the poker hand where the poker hand enhancement was previously used, until the poker hand enhancement has been used by the lowest one of the vertically aligned poker hands.

15. The electronic poker device of claim 12, wherein the processor is further configured to cause the display to move the poker hand enhancement from a position outside of the plurality of poker hands to the randomly designated one of the card positions of the top poker hand.

16. The electronic poker device of claim 12, wherein the processor is further configured to cause the display to move a visible item from a position outside of the plurality of poker hands to designate the randomly designated one of the card positions of the top poker hand, and to place a wild card as the poker hand enhancement at the randomly designated one of the card positions designated by the visible item.

17. A gaming apparatus for playing poker games, comprising:

a display configured to present a first poker hand and a second poker hand, each of the first poker hand and the second poker hand having a plurality of card positions;

a user interface including at least one mechanism to allow for player interaction during the poker games; and a processor configured to:

receive a signal to initiate a first poker game;

randomly select cards to present in the card positions of the first poker hand;

determine if a poker hand enhancement is associated with any of the card positions of the first poker hand;

display the randomly selected cards in the card positions of the first poker hand, where a randomly selected card to be displayed in a card position that is determined to be associated with the poker hand enhancement includes a multiplier subsymbol in that card position of the first poker hand;

facilitate an opportunity for cards to be held in the first poker hand;

copying any cards held from the first poker hand to respectively associated card positions in the second poker hand;

randomly selecting draw cards to replace any non-held cards in the first poker hand and the second poker hand and displaying the randomly selected draw cards on the display to form a first final poker hand and a second final poker hand;

evaluate the first final poker hand and the second final poker hand for card combinations associated with awards, where if the awards of the first final poker hand are multiplied by a value of the multiplier subsymbol if present;

receive a signal to initiate a second poker game; and move the multiplier subsymbol from the first poker hand to a corresponding one of the card positions in the second poker hand for use in the second poker game.

18. The gaming apparatus of claim 17, wherein the value of the multiplier subsymbol associated with the poker hand enhancement is randomly determined.

19. The gaming apparatus of claim 18, wherein the value of the multiplier subsymbol associated with the poker hand enhancement is randomly re-determined when the poker hand enhancement is moved from the first poker hand to a corresponding one of the card positions in the second poker hand for use in the second poker game.

20. The gaming apparatus of claim 18, wherein the value of the multiplier subsymbol associated with the poker hand enhancement is incremented when the poker hand enhancement is moved from the first poker hand to a corresponding one of the card positions in the second poker hand for use in the second poker game.

* * * * *